Patented Aug. 6, 1935

2,010,005

UNITED STATES PATENT OFFICE 2,010,005

MOTOR FUEL

Julius F. T. Berliner, Wilmington, Del., assignor to E. I. du Pont de Nemours & Company, Wilmington, Del., a corporation of Delaware No Drawing. Application April 6, 1932, Serial No. 603,679

6 Claims. (Cl. 44—9)

This invention relates to an improved fuel for fuel-lubricated internal combustion engines and it is the particular object of the invention to provide a speed fuel for use in racing motor boats.

I have found that mixtures of methanol with subordinate amounts of the higher boiling liquids, principally alcohols boiling up to 200° C. and obtainable as by-products in the catalytic synthesis of methanol from hydrogen and oxide of carbon, are exceptionally well adapted for use as fuels in the operation of fuel-lubricated engines such as are employed in high speed motor boats. It is known that by catalytic reaction of hydrogen and oxide of carbon under pressure methanol can be, and is now commercially, produced along with other organic liquids, principally alcohols, boiling up to about 300° C. and above. A process for the manufacture of such materials is described, for example, in U. S. Reissue Patent No. 18,302. Among the higher alcohols so produced are n-propanol, isobutanol, 2-methyl butanol-1, 2,4-dimethyl pentanol-3, 2-methyl pentalol-1, 4-methyl hexanol-1, and other primary and secondary alcohols, the amount and relative proportions of which depend upon the specific conditions of manufacture, especially reaction temperature and catalyst. The higher boiling liquids used in accordance with the invention are such as may be obtained by fractional distillation of crude synthetic methanol rejecting such materials as boil above 200° C., these latter having been found to be unsuited for the purpose, and using in a dry state all or fractions of the mixtures boiling above methanol and up to 200° C.

I have prepared unusually powerful and generally desirable fuels of the self-lubricating type by adding to the aforesaid mixtures of methanol and higher boiling alcohols vegetable oil, for example, castor oil, rape seed oil, soya bean oil, or the like. An important characteristic of my fuels is the relative low content of oil therein, for whereas in the case of my new fuels no more than 15% castor oil, for example, is required for efficient lubrication, fuels now in general use for the same purpose require over 15% and even as much as 20% of lubricant.

Dynamometer tests have shown that the most powerful compositions are those containing about 60–75 parts by volume of methanol and 24–10 parts by volume of the higher boiling by-products of the methanol synthesis as above described. Furthermore, an increase in the power of the foregoing composition is realized if a volatile hydrocarbon of high calorific value, is added such, for example, as benzol, toluol, gasoline, kerosene, etc., in proportions not to exceed about one-half of the volume of the higher boiling alcohols. Within the limits stated, but not otherwise, the volatile hydrocarbons produce a substantial increment of power, an improvement of the order of 1.5%.

My speed fuels may be produced then by admixing the several ingredients in the following relative proportions:

| | Parts by volume |
|---|---|
| Methanol | 60–75 |
| Higher boiling by-products of methanol synthesis | 24–10 |
| Volatile hydrocarbon, e. g. benzol | Up to 12 |

To make a self-lubricating fuel a suitable vegetable oil, preferably castor oil, is added to the foregoing in amount which need not exceed 15% of the total composition.

A fuel of about the following composition is preferred, it having in rigorous practical tests given the best results: methanol 71%, higher boiling by-products of methanol synthesis (boiling range 133–200° C.) 15%, benzol 5%, castor oil 9%. This fuel gave over 7% more power than high test gasoline, functioned satisfactorily in any of the stock motor boat engines without alteration thereof (except that in some types fuel lines had to be enlarged), and required no further addition of lubricants.

I claim:

1. An improved outboard motor fuel of the fuel lubricated type comprising by volume 60–75% methyl alcohol, 24–10% liquid by-products of the catalytic hydrogenation of oxide of carbon to methyl alcohol boiling in the range 133–200° C., a substantial quantity of hydrocarbon spirit boiling in the gasoline range and not exceeding one half the volume of said liquid by-products, and a substantial quantity of vegetable oil not exceeding 15% of the total composition.

2. An improved outboard motor fuel of the fuel lubricated type comprising by volume 60–75% methyl alcohol, 24–10% liquid by-products of the catalytic hydrogenation of oxide of carbon to methyl alcohol boiling in the range 133–200° C., a substantial quantity of hydrocarbon spirit boiling in the gasoline range and not exceeding one half the volume of said liquid by-products, and a substantial quantity of castor oil not exceeding 15% of the total composition.

3. An improved outboard motor fuel of the fuel lubricated type comprising by volume 60–75% methyl alcohol, 24–10% liquid by-products of the catalytic hydrogenation of oxide of carbon to methyl alcohol boiling in the range 133-200° C., a substantial quantity of benzol and not exceeding one half the volume of said liquid by-products, and a substantial quantity of castor oil not exceeding 15% of the total composition.

4. An improved outboard motor fuel of the fuel lubricated type comprising by volume 60-75% methyl alcohol, 24-10% liquid by-products of the catalytic hydrogenation of oxide of carbon to methyl alcohol boiling in the range 133-200° C., a substantial quantity of gasoline and not exceeding one half the volume of said liquid by-products, and a substantial quantity of castor oil not exceeding 15% of the total composition.

5. A motor fuel comprising about 71% methanol, 5% benzol, 9.0% castor oil, and 15% of the liquid by-products of the catalytic synthesis of methanol boiling between about 133 and 200° C.

6. A motor fuel comprising about 71% methanol, 5% gasoline, 9% castor oil, and 15% of the liquid by-products of the catalytic synthesis of methanol boiling between about 133-200° C.

JULIUS F. T. BERLINER.